United States Patent
Zhou et al.

(10) Patent No.: US 9,201,825 B1
(45) Date of Patent: Dec. 1, 2015

(54) DATA STORAGE METHODS AND APPARATUS

(71) Applicant: Marvell International Ltd., Hamilton (BM)

(72) Inventors: Wei Zhou, San Jose, CA (US); Chee Hoe Chu, San Jose, CA (US); Po-Chien Chang, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 530 days.

(21) Appl. No.: 13/667,067

(22) Filed: Nov. 2, 2012

Related U.S. Application Data

(60) Provisional application No. 61/554,878, filed on Nov. 2, 2011.

(51) Int. Cl.
*G06F 13/28* (2006.01)
*G06F 13/38* (2006.01)

(52) U.S. Cl.
CPC .................................... *G06F 13/385* (2013.01)

(58) Field of Classification Search
CPC .................................................... G06F 13/385
USPC ............................................................ 710/22
See application file for complete search history.

(56) References Cited

U.S. PATENT DOCUMENTS

2011/0320690 A1* 12/2011 Petersen et al. ............... 711/103
2013/0007332 A1*  1/2013 Teh et al. ....................... 710/313

* cited by examiner

*Primary Examiner* — Chun-Kuan Lee

(57) ABSTRACT

A flash controller includes a PCIe interface, a DMA engine module, a memory control module, and a flash control module. The PCIe interface communicates with a host device and receives first data from the host device. The first data is formatted using a native PCIe protocol and includes a first key-value pair that is to be stored in first memory. The first memory includes flash memory. The first key-value pair includes a first unique number and the first data. The PCIe interface receives second data from the first memory and transmits the second data from the host device. The second data is formatted using the native PCIe protocol and includes a second key-value pair. The second key-value pair includes a second unique number and the second data. The DMA engine module transfers the first and second data between the PCIe interface, the first memory and second memory.

20 Claims, 9 Drawing Sheets

DATA STORAGE METHODS AND APPARATUS

CROSS-REFERENCE TO RELATED APPLICATIONS

This application claims the benefit of U.S. Provisional Application No. 61/554,878, filed on Nov. 2, 2011. The entire disclosure of the above application is incorporated herein by reference.

FIELD

The present disclosure relates to data storage devices, and more particularly to data storage devices including NAND flash memory.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

NAND flash-based solid-state drives (SSDs) typically employ serial Advanced Technology attachment (SATA) or serially attached small computer system interface (SCSI) (SAS) interfaces. The SATA and SAS interfaces implement ATA and SCSI storage protocols and command sets, respectively. When writing data to or reading data from these SSDs, there is a significant amount of processing and overhead that is performed, which increases latency. For example, the SSD interfaces typically use a block device protocol and logical to physical page mapping tables to locate a physical page for data storage or retreival.

SUMMARY

A flash controller is provided and includes a Peripheral Component Interconnect Express (PCIe) interface, a direct memory access (DMA) engine module, a memory control module, and a flash control module. The PCIe interface is configured to communicate with a host device and receive first data from the host device. The first data is formatted using a native PCIe protocol and includes a first key-value pair. The first key-value pair is to be stored in first memory. The first memory includes flash memory. The first key-value pair includes a first unique number and the first data. The PCIe interface is also configured to receive second data from the first memory and transmit the second data from the host device. The second data is formatted using the native PCIe protocol and includes a second key-value pair. The second key-value pair includes a second unique number and the second data. The DMA engine module is configured to transfer the first data and the second data between the PCIe interface, the first memory and second memory. The flash control module is configured to control the first memory. The memory control module is configured to control the second memory. In other features, the first data and the second data are stored as key-value pairs in the first memory using a B tree data structure.

In other features, a system is provided and includes a driver module and a first PCIe interface. The driver module is configured to provide a data storage interface for an application executed by the system. The first PCIe interface is configured to: communicate with the driver module; communicate with a second PCIe interface associated with a flash controller for flash memory; send first key-value pairs to the second PCIe interface using a native PCIe protocol for storage in the flash memory; and receive second key-value pairs from the second PCIe interface using the native PCIe protocol after retrieval from the flash memory. Each of the first key-value pairs and each of the second key-value pairs includes a unique number and a data value.

In other features, the flash controller includes the second PCIe interface. The flash controller is configured to: store the first key-value pairs to the flash memory in a B tree data structure; and retrieve the second key-value pairs from the flash memory.

In other features, a method is provided and includes: providing a data storage interface for an application executed by a system; communicating with a driver module via a first PCIe interface; communicating with a second PCIe interface associated with a flash controller for flash memory; sending first key-value pairs to the second PCIe interface using a native PCIe protocol for storage in the flash memory; and receiving second key-value pairs from the second PCIe interface using the native PCIe protocol after retrieval from the flash memory. Each of the first key-value pairs and each of the second key-value pairs includes a unique number and a data value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figures 9, 10, 11:
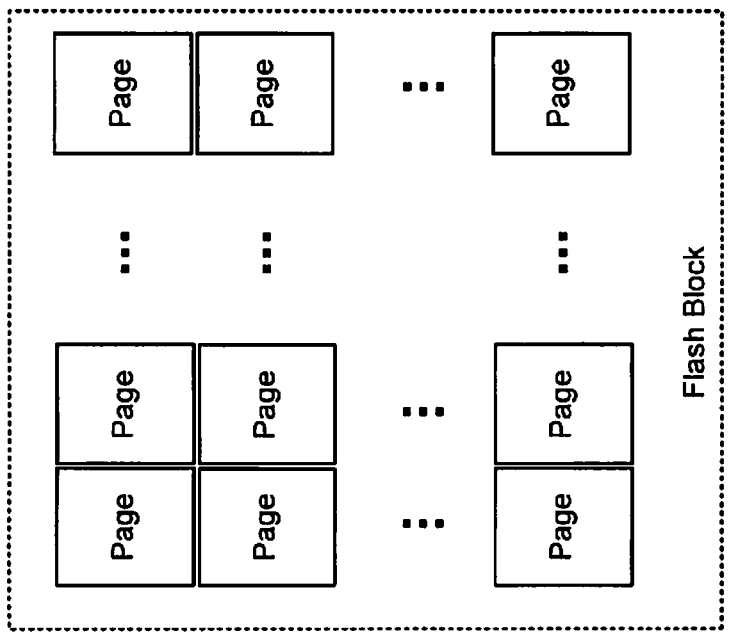
FIG. 9 illustrates an example of a NAND flash block including a plurality of pages according to the present disclosure.
FIG. 10 illustrates an example of a data page including a sequence of key-value pairs according to the present disclosure.
FIG. 11 illustrates an example of an index page including a sequence of key-pointer pairs according to the present disclosure.

The present disclosure relates to an efficient implementation of a key-value storage interface for NAND flash SSD. The term "key-value" may refer to, for example, one or more key and value pairs, which are sequentially stored in the NAND flash SSD. A key may refer to, for example, a unique number that is associated with a stored data value or pointer, as shown in FIGS. 10 and 11. Traditional NAND flash SSDs typically employ serial Advanced Technology attachment (SATA) interface or a serially-attached Small Computer System Interface (SCSI) (SAS). These interfaces implement storage protocols and command sets such as SCSI or Advanced Technology Attachment (ATA). The present disclosure relates to an SSD using a native Peripheral Component Interconnect Express (PCIe) protocol to provide a more flexible interface for implementing more efficient data storage and look up.

Figure 1:
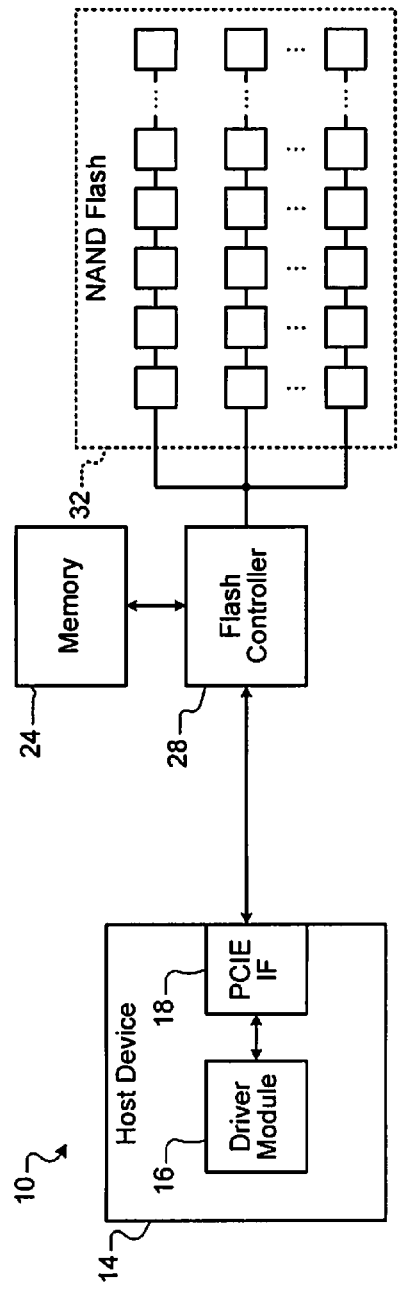
FIG. 1 is a functional block diagram of an example of a solid state drive (SSD) storage system according to the present disclosure.

Referring now to FIG. 1, an example of a storage system 10 includes a host device 14. The host device 14 includes a driver module 16 and a peripheral component interconnect express (PCIe) interface 18. As will be described further below, the driver module 16 implements a direct query interface over the PCIe interface 18. The PCIe interface 18 communicates with a flash controller 28. While components of the flash controller 28 are shown implemented as a single IC, one or more ICs may be used. The flash controller 28 stores and retrieves data from memory 24. In some examples, the memory 24 includes double data rate (DDR) memory. The flash controller 28 also stores and retrieves data from NAND flash memory 32.

Figure 2:
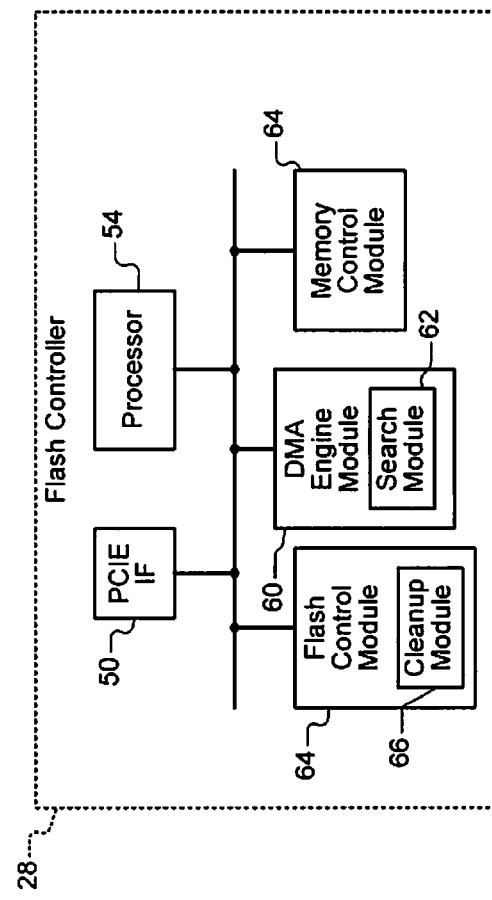
FIG. 2 is a functional block diagram of an example of a flash controller according to the present disclosure.

Referring now to FIG. 2, an example of the flash controller 28 is shown in further detail. The flash controller 28 includes a PCIe interface 50, a processor or central processing unit (CPU) 54, a memory control module 56, a direct memory access (DMA) engine module 60 and a flash control module 64. The processor 54 may perform processing for the memory control module 56, the DMA engine module 60 and/or the flash control module. In some examples, the memory control module 56 for the memory 24 corresponds to a DDR control module for DDR memory. As will be described in further detail below, the flash controller 28 implements a PCIe protocol. In some examples, the DMA engine module 60 may include a search module 62 that searches the data as it is transferred by the DMA engine module 60. As an example, the data may be searched for length information. The length information may include lengths of keys and/or data, which may be used to retrieve keys during data movements. In some examples, the flash control module 64 may include a cleanup module 66 that performs garbage collection on the NAND flash memory 32 to increase free space.

The driver module 16 implements a direct query interface that includes various commands including but not limited to put, get or remove commands. The put command (example syntax: Put(Key Value)) is used to insert a value into storage using a key as an index. The key may be used as an index to store the data value in a B tree structure, as is further described below. The get command (example syntax: Get(Key Value)) returns a stored value that is associated with the key from storage. The remove command removes stored data that is associated with the key. According to the present disclosure, these commands are implemented over the PCIe interface without being translated into SCSI or ATA command sets, which saves both software and hardware overhead and provides faster lookup and response times.

Figure 3:
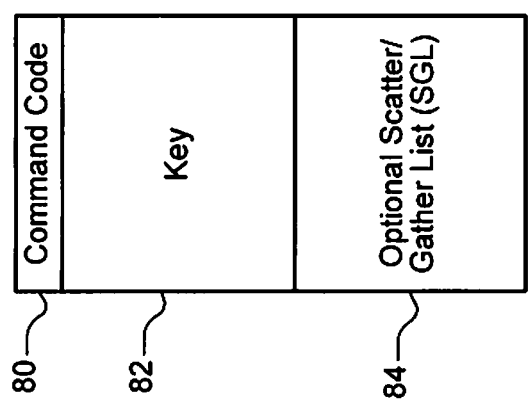
FIG. 3 illustrates an example of a command format according to the present disclosure.

Referring now to FIG. 3, an example of a command format is illustrated. The command may include a command code 80, a key 82 and an optional scatter/gather list 84. In some examples, the command code 80 may be a one-byte field and the key 82 may be an n-byte field. The scatter/gather list 84 may point to a memory location where values are stored for the put command. Alternately, the scatter/gather list 84 may point to a memory location where values to be stored are located for a get command. The scatter gather list 84 is not used for the remove command.

Figure 4:
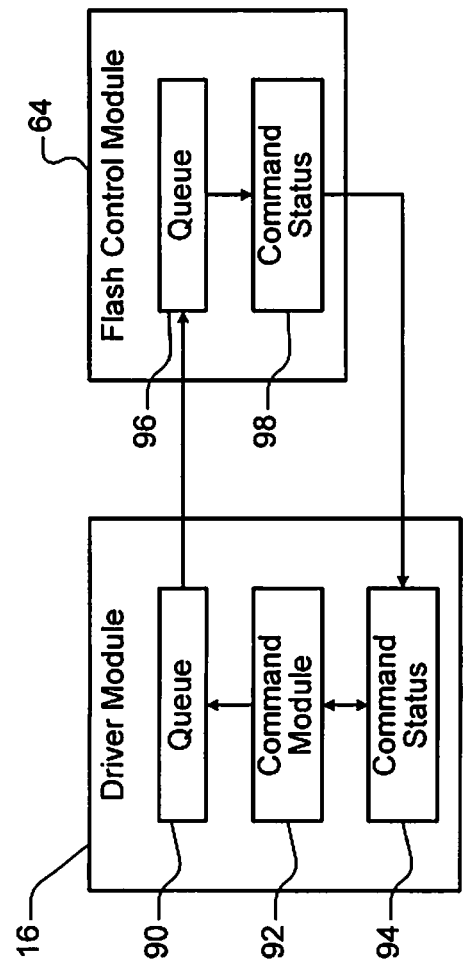
FIG. 4 is a functional block diagram illustrating an example of queues used by a driver module and a flash controller.

Referring now to FIG. 4, the driver module 16 may include a queue 90, a command module 92 and a command status register 94. The flash controller 28 may include a queue 96 and a command status register 98. The queues 90 and 96 are used to facilitate efficient command passing and execution. Commands are stored in the queue 90 on the driver side and may be moved to the queue 96 associated with the flash controller 28 in batches.

Figure 5:
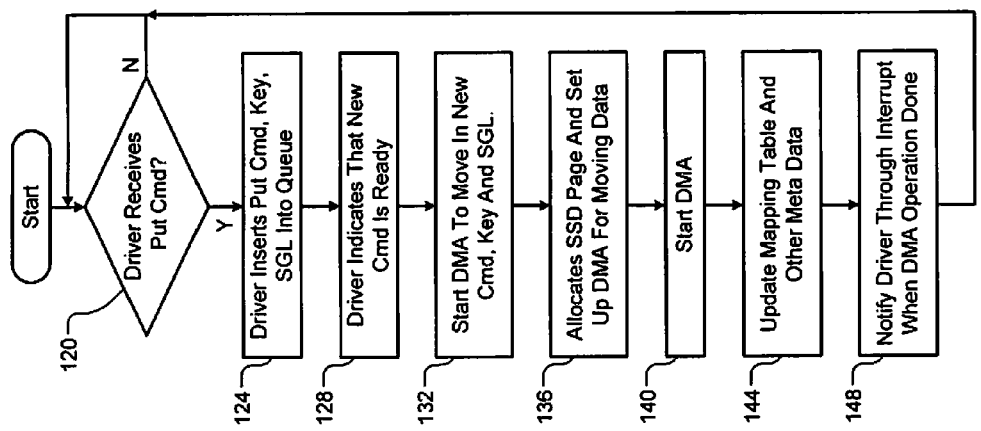
FIG. 5 is a flowchart illustrating an example of a method for executing a put command according to the present disclosure.

Referring now to FIG. 5, illustration of an example of a method for performing the put command is illustrated. At 120, the driver module determines whether it has received a put command. If true, the driver module inserts the put command, key and scatter/gather list (SGL) into the queue at 124. At 128, the driver module notifies the flash controller that a new command is ready. At 132, the DMA operation is started to move in the new command, key and SGL. At 136, an SSD page is allocated and the DMA operation is set up for moving data. At 140, the DMA operation is started. At 144, a mapping table and other metadata (described in FIG. 13 below) are updated if needed. At 148, the driver module is notified through an interrupt when the DMA operation is complete.

Figure 6:
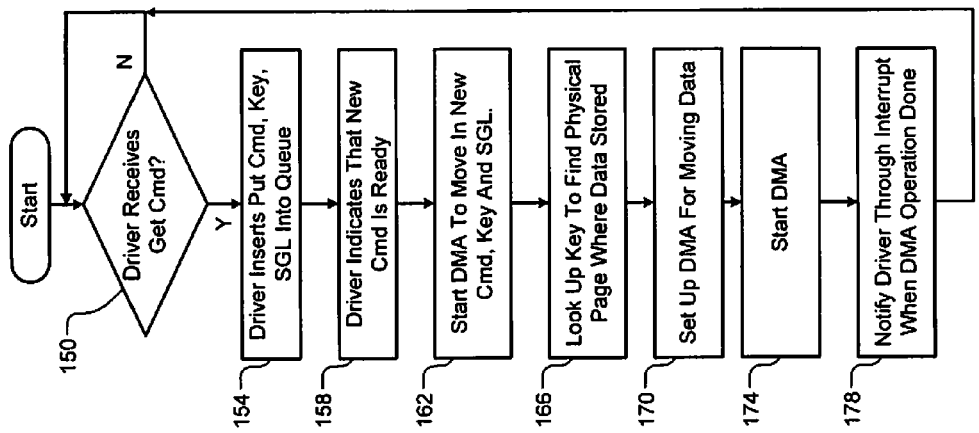
FIG. 6 is a flowchart illustrating an example of a method for executing a get command according to the present disclosure.

Referring now to FIG. 6, illustration of an example of a method for performing the get command is illustrated. At 150, the driver module determines whether it has received a get command. If true, the driver module inserts the get command, key and SGL into the queue at 154. At 158, the driver notifies the flash controller that the new command is ready. At 162, the DMA operation is started to move in the new command, key and SGL. At 166, the key is used to find a physical page where the data is stored. The value and/or length of the key is used to search for the corresponding value of the stored data. As an example, the NAND flash may be searched based on the value and/or length of the key to locate the stored data. At 170, the DMA operation is set up for moving data from the NAND flash to the host. At 174, the DMA operation is started. At 178, the driver module is notified through an interrupt when the DMA operation is complete.

Figure 7:
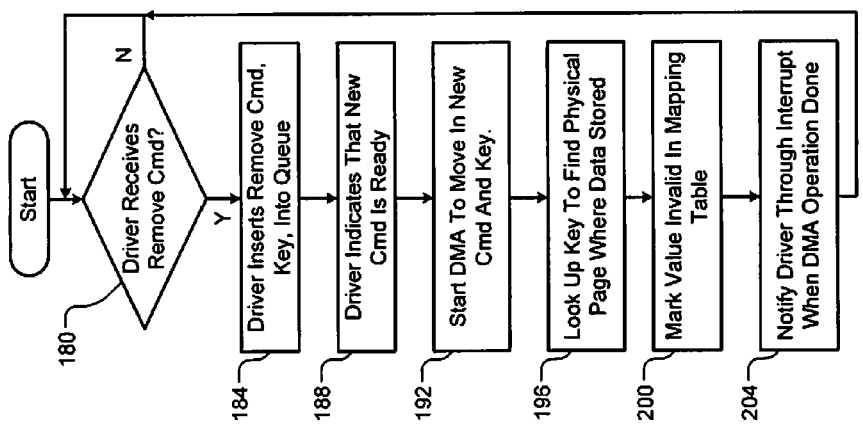
FIG. 7 is a flowchart illustrating an example of a method for executing a remove command according to the present disclosure.

Referring now to FIG. 7, illustration of a method for performing the remove command is shown. At 180, the driver module determines whether it has received a remove command. If true, the driver inserts the remove command and key into the queue at 184. At 188, the driver module notifies the flash controller that the new command is ready. At 192, the DMA operation is started to move in the new command and key. At 196, the key is used to find the physical page where the data is stored. At 200, the value corresponding to the physical page where the data is stored is marked as invalid in the mapping table. At 204, the driver is notified through an interrupt when the DMA operation is complete.

Figure 8:
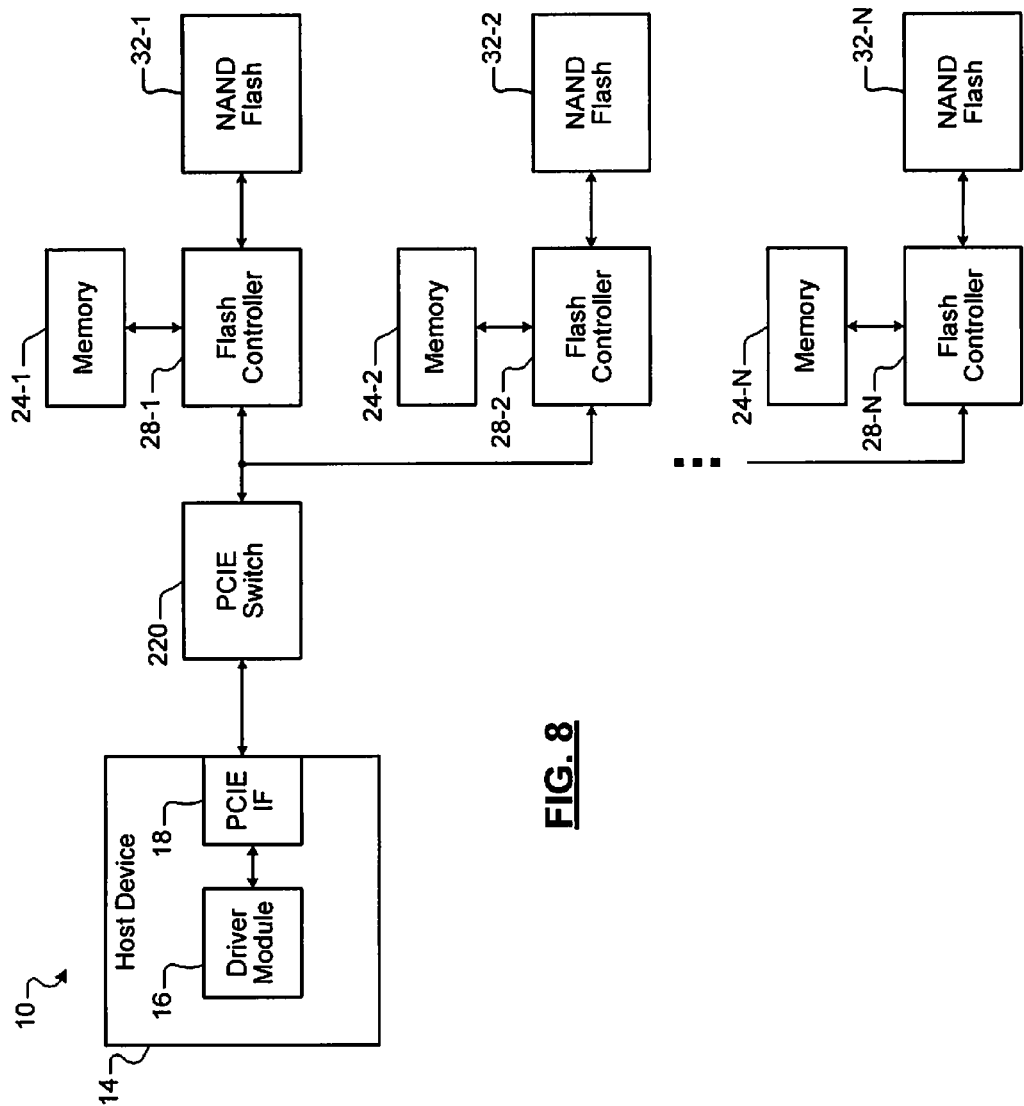
FIG. 8 is a functional block diagram of an example of a SSD storage system including a PCIe switch connected to a plurality of flash control modules according to the present disclosure.

Referring now to FIG. 8, a PCIe switch 220 may be inserted between the PCIe interface 18 of the host device 14 and a plurality of flash controllers 28-1, 28-2, ..., and 28-N (collectively flash controllers 28). Each of the flash controllers 28 may be associated with memory 24-1, 24-2, ..., and 24-N (collectively memory 24) and NAND flash memory 32-1, 32-2, ..., and 32-N (collectively NAND flash memory 32), respectively. Each of the flash controllers 28 communicates using the PCIe interface, supports the direct query interface and supports commands such as put, get and remove. The driver module 16 of the host device 14 may implement a hash function to distribute keys evenly across all of the flash controllers 28. Each of the flash controllers 28 performs put, get and remove operations independently and in parallel to speed up the performance of the SSD storage system.

As can be appreciated, the storage system according to the present disclosure allows protocol and command translation and interpretation (such as SCSI or ATA) to be bypassed. Applications executed by the host device can easily access data through the simplified command set. The system supports fast lookup and searches due to the reduced software and hardware overhead. In addition, parallel searching and lookup may be performed using multiple flash controllers associated with different NAND flash memory.

Referring now to FIGS. 9-11, the storage system according to the present disclosure employs a key-value storage system over the PCIe interface to access the NAND flash. Traditional SSDs implement a block device protocol and use logical to physical page mapping tables for locating a physical page that stores the data. The PCIe-based SSD according to the present disclosure provides a more flexible interface as compared to interfaces using traditional SCSI/ATA command sets. The native key-value storage system does not need to perform logical to physical page mapping and translation, which reduces memory usage and provides fast search/query service.

In FIG. 9, NAND flash blocks include a plurality of pages. Each page can be either a data page or an index page. In FIG. 10, a data page is shown. The data page stores key-value pairs sequentially. The key-value pairs in each data page are ordered by the key. In FIG. 11, index pages are used to store key-pointer pairs. Pointers can either point to a physical page in NAND flash or a page in the memory 24 (which would correspond to a cached physical page).

Figure 12:
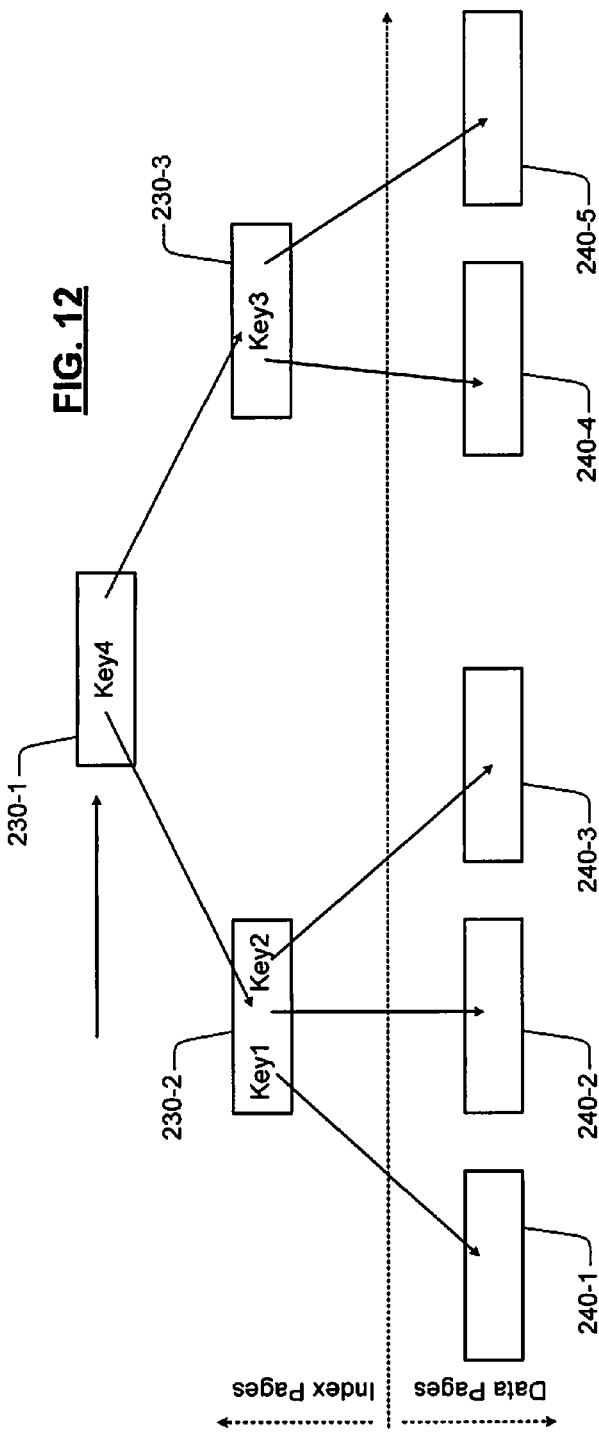
FIG. 12 illustrates an example of index pages and data pages arranged in a B tree data structure according to the present disclosure.

Referring now to FIG. 12, an example illustrates index pages and data pages arranged in a B tree data structure. In the example, index pages 230-1, 230-1, and 230-3 and data pages 240-1, 240-2, 240-3, 240-4, and 240-5 are logically arranged in the B tree data structure. In some examples, the data pages are located at leaf nodes and the index pages are located at a root node and the other nodes. Physically only a small portion of the tree is cached in the memory 24 and a majority of the pages are located in NAND flash memory 32. In some examples, the root index may be stored in the memory 24.

Figure 13:
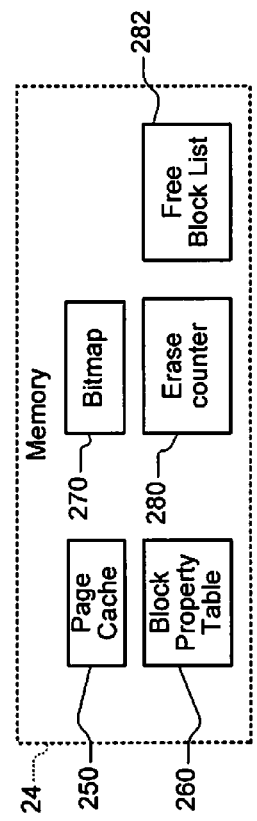
FIG. 13 is a functional block diagram of an example of memory attached to the flash control module according to the present disclosure.

Referring now to FIG. 13, the memory 24 is shown to include a page cache 250, a block property table 260, a bitmap 270, an erase counter 280 and a free block list 282. A majority of the memory 24 (such as DDR) is organized as page cache 250. In some examples, the page size of the page cache 250 is equal to the page size of the NAND flash. In some examples, the page size of the NAND flash is 4K bytes or 8K bytes, although other sizes may be used. Whenever a physical page is accessed, it is fetched into the page cache 250 if the page is not already located in the page cache 250. This ensures that all of the pages in the page cache 250 will also have their parent pages in the page cache 250. In some examples, the page cache 250 follows a FIFO replacement policy. In other words, the page cache replaces pages that stored in the page cache 250 the earliest. Pages that are swapped out the page cache 250 are written to new physical pages and the page cache is marked as invalid in the block property table 260. When writing pages out of the page cache 250, the leaf node and all of the ancestor pages are written out and pointers are adjusted accordingly to point to the correct new physical page. The original page is marked as invalid in the block property table 260.

Figure 14:
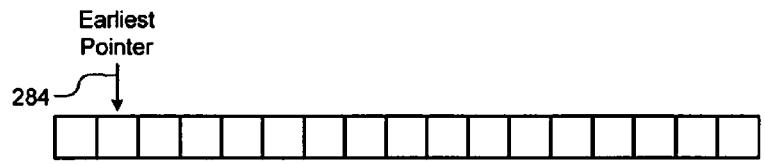
FIG. 14 illustrates an example of a page cache according to the present disclosure.
Figure 15:
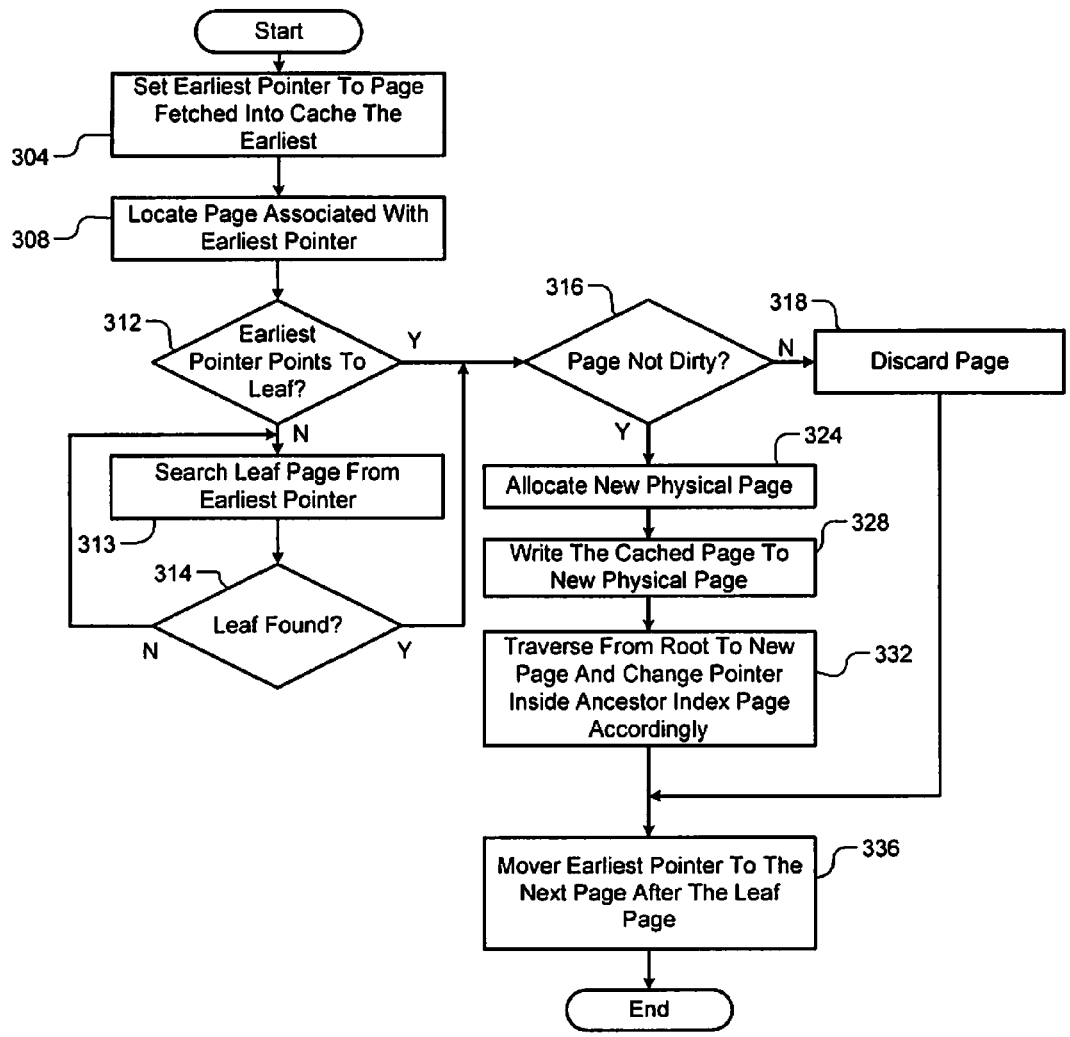
FIG. 15 is a flowchart illustrating an example of a replacement method for the page cache according to the present disclosure.

Referring now to FIGS. 14 and 15, the page cache 250 may be organized as a circular buffer. In FIG. 14, an earliest pointer 284 points to the earliest page that was fetched into the page cache 250. In FIG. 15, an example of a page replacement method is illustrated. At 304, the earliest pointer is set to the earliest page that was fetched into the page cache 250. At 308, the page associated with the earliest pointer is located. At 312, if the earliest pointer does not point to a leaf node, a search is performed for a leaf node from the earliest pointer at 313 and 314 and operation continues with 316 when the leaf node is found. At 316, control determines if the page is dirty or invalid. If 312 is false, control discards the page at 318. If 312 is true, a new physical page is allocated at 324. At 328, a cached page is written to the new physical page. At 332, control traverses from the root to the new page and changes a pointer associated with all of the ancestor index pages. At 336, the earliest pointer is moved to the next page after the leaf page.

Search, insert and delete operations may be carried out following the logical B tree syntax. Operations may be started from a root page which may reside at a fixed location inside the memory 24. Keys are compared at the root page and index pages in the B Tree hierarchy. Following the pointers inside the index page, physical pages that contain the correct keys are brought to the page cache. The changed data pages and their ancestor index pages remain stored in the page cache until being swapped out.

The block property table 260 may be maintained in the memory 24 for tracking properties for the physical NAND flash blocks. The bitmap 270 is maintained for each of the physical NAND flash blocks to indicate the valid pages inside of the block. The number of valid pages will be used to select a proper block for garbage collection to free up space. The erase counter 280 is maintained for each of the physical NAND flash blocks to indicate how many times the block has been erased. The free block list 282 is used to monitor and maintain a list of free blocks that are generated due to garbage collection.

The cleanup module 66 may perform garbage collection to increase free space. Blocks are chosen by the cleanup module 66 to be garbage collected based on the number of valid pages inside the block and the number of times the block has been erased. The garbage collection strikes a balance between efficiency and uniform wear level. During garbage collection, the cleanup module 66 moves valid pages to new physical pages. The ancestor index pages are also moved to new physical pages with pointers changed accordingly. The ancestor index pages are located by traversing the B tree from the root.

The present disclosure eliminates logical to physical page mapping required by the SAS and SATA interfaces, which decreases memory usage and reduces latency and complexity. Using a native B tree implementation also enables faster query and look up. As a result, the memory and cache can be used more efficiently.

As can be seen in FIG. 2, in some examples the DMA engine module 60 may include the search module 62. Traditional DMA engines simply move data from one location to another and are not able to search the data for key and data length information. The DMA engine module 60 with the search module 62 performs searching to improve performance. As discussed above, the storage system stores key-value pairs sequentially in the physical pages. The key length and the value length are known to the DMA engine module 60. The DMA engine module 60 uses the length information to locate and retrieve keys during data movement. The DMA engine module 60 performs search operations on the data during data movement.

Figure 16:
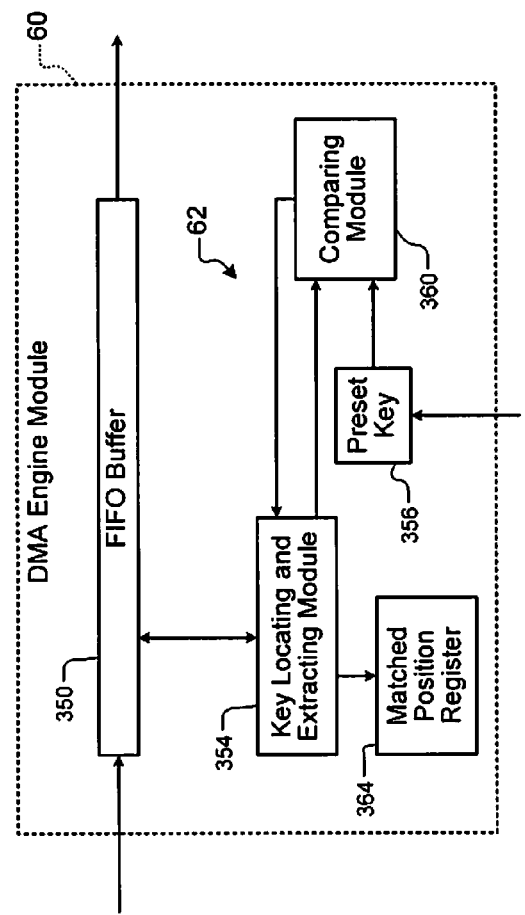
FIG. 16 illustrates an example of a DMA engine module with a search module according to the present disclosure.

Referring now to FIG. 16, the DMA engine module 60 includes a FIFO buffer 350 and the search module 62. The search module 62 includes a key locating and extracting module 354, a predetermined key register 356, a comparing module 360, and a matched position register 364. The DMA engine module 60 transfers data in through the FIFO buffer 350 before moving the data to a destination memory. The key locating and extracting module 354 locates and extracts keys from the data in the FIFO buffer 350 using the key length and value length data. The extracted keys are output to one input of the comparing module 360. The predetermined key register 356 stores a key received from an application associated with the host device 14 or another source. The comparing module 360 compares the extracted keys to the predetermined key and generates a match signal when a match occurs. In some examples, the comparing module 360 may include an exclusive OR (XOR) gate. When the output of the XOR gate is equal to zero, the matched key is found. The offset position of the key is recorded in the matched position register 364. The key-value pair may be located based on the offset.

Figure 17:
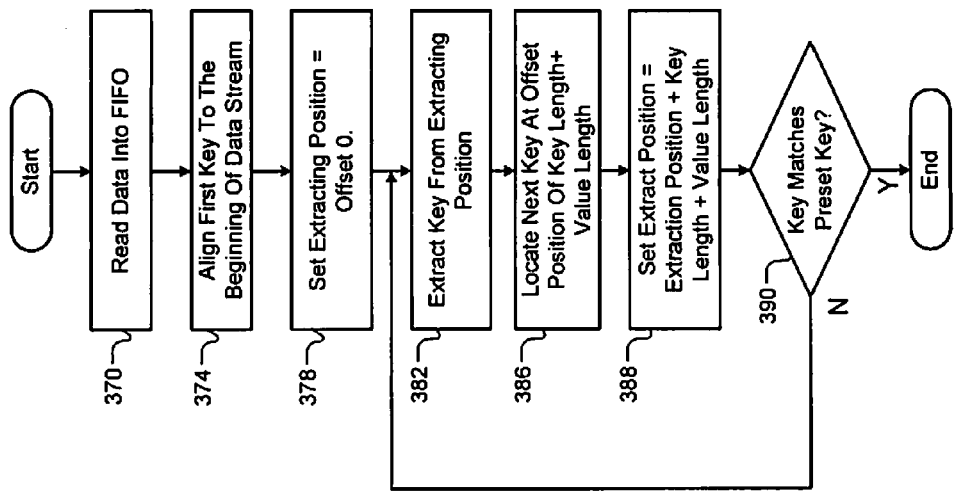
FIG. 17 is a flowchart illustrating an example of a key extraction method for data transferred by the DMA engine module according to the present disclosure.

Referring now to FIG. 17, an example of a key extraction method is shown. At 370, data is read into the FIFO buffer. At 374, a first key is aligned to the beginning of the data stream. At 378, the extracting position is set to an offset of zero. At 382, the key is extracted from the extracting position. At 386, the next key is located at an offset position equal to the key length+the value length. At 388, the extract position is set equal to the extraction position+the key length+the value length. At 390, a determination is made whether the key matches the predetermined key. If not, operation returns to 382.

Figure 18:
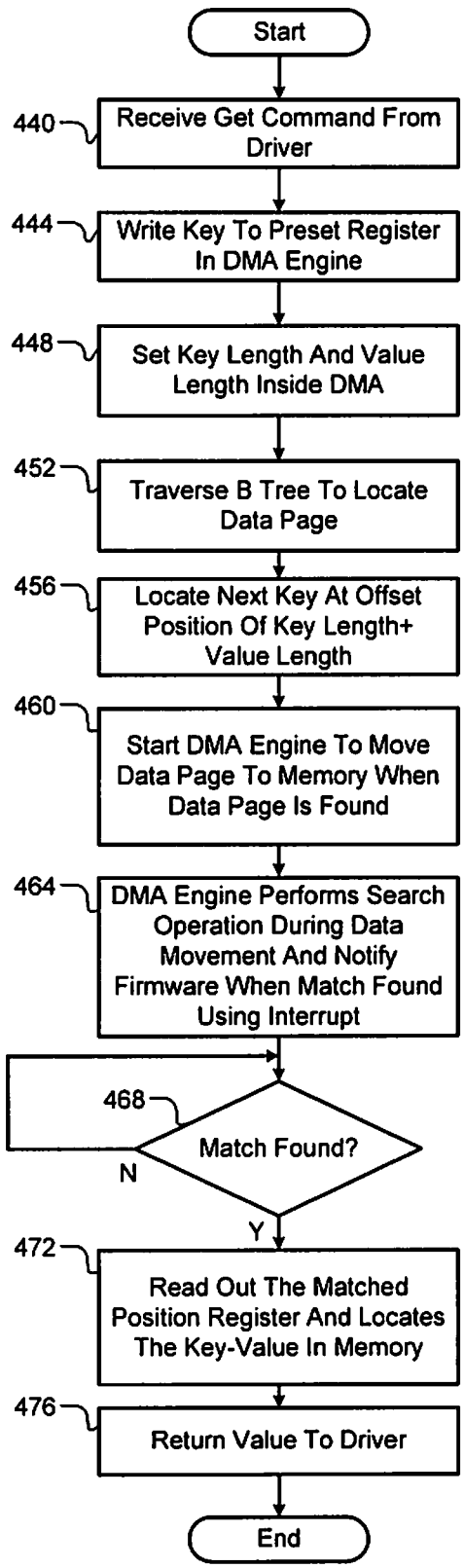
FIG. 18 is a flowchart illustrating searches performed by the DMA engine module according to the present disclosure.

Referring now to FIG. 18, an example of search operation method is shown. At 440, firmware receives a get command from the driver module. At 444, the firmware writes a key from the application or another device to the predetermined register in the DMA engine. At 448, the key length and value length are set inside the DMA. At 452, the B tree data structure is traversed to locate a data page. At 456, the next key is located at an offset position of key length plus value length. At 460, the DMA engine is started to move the data page to memory when the data page is found. At 464, the DMA engine module performs the search operation during data movement and identified when a match is found using an interrupt. At 468, if a match is found, the matched position register is read at 472 and the key is located in memory based upon the offset stored in the matched position register. At 476, the value corresponding to the key may be output to the driver module.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module and/or circuit may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A flash controller, comprising:
   a Peripheral Component Interconnect Express (PCIe) interface configured to
      communicate with a host device,
      receive first data from the host device, wherein the first data is formatted using a native PCIe protocol and includes a first key-value pair, wherein the first key-value pair is to be stored in first memory, wherein the first memory includes flash memory, and wherein the first key-value pair includes a first unique number and the first data,
      receive second data from the first memory, and
      transmit the second data from the host device, wherein the second data is formatted using the native PCIe protocol and includes a second key-value pair, and wherein the second key-value pair includes a second unique number and the second data;
   a direct memory access (DMA) engine module configured to transfer the first data and the second data between the PCIe interface, the first memory and second memory;

a flash control module configured to control the first memory; and a memory control module configured to control the second memory.

2. The flash controller of claim 1, wherein the first memory includes NAND flash memory and the second memory includes double data rate (DDR) memory.

3. The flash controller of claim 1, wherein the PCIe interface communicates with a PCIe interface of the host device.

4. The flash controller of claim 1, wherein the first data and the second data are stored as key-value pairs in the first memory using a B tree data structure.

5. The flash controller of claim 1, wherein the DMA engine module includes:

a first in first out (FIFO) buffer that receives at least one of the first data and the second data; and a search module that searches at least one of the first data and the second data for a predetermined key while the at least one of the first data and the second data are being transferred.

6. The flash controller of claim 5, wherein the search module includes:

a key locating and extracting module configured to locate a plurality of keys in the at least one of the first data and the second data based on key lengths and value lengths; and a comparing module configured to compare the predetermined key to the plurality of keys and to generate a match signal when the predetermined key matches one of the plurality of keys, wherein the key locating and extracting module determines an offset based on the match signal, the key lengths and the value lengths.

7. A system, comprising:

a driver module configured to provide a data storage interface for an application executed by the system;

a first Peripheral Component Interconnect Express (PCIe) interface configured to communicate with the driver module, communicate with a second PCIe interface associated with a flash controller for flash memory, send first key-value pairs to the second PCIe interface using a native PCIe protocol for storage in the flash memory, and receive second key-value pairs from the second PCIe interface using the native PCIe protocol after retrieval from the flash memory, wherein each of the first key-value pairs and each of the second key-value pairs includes a unique number and a data value;

a direct memory access (DMA) engine module configured to transfer data between the second PCIe interface, a first memory and a second memory;

a flash control module configured to control the first memory; and a memory control module configured to control the second memory.

8. The system of claim 7, further comprising the flash controller comprising the second PCIe interface and configured to store the first key-value pairs to the flash memory in a B tree data structure and to retrieve the second key-value pairs from the flash memory.

9. The system of claim 8, wherein:

the flash memory is the first memory and is connected to the flash controller, the flash controller further comprises the direct memory access (DMA) engine module, the flash control module, and the memory control module.

10. The system of claim 9, wherein the flash controller is implemented as an integrated circuit.

11. The system of claim 9, wherein the second memory includes double data rate (DDR) memory.

12. The system of claim 9, wherein the DMA engine module includes:

a first in first out (FIFO) buffer that receives at least one of first data and second data; and a search module that searches at least one of the first data and the second data for a predetermined key while the at least one of the first data and the second data is being transferred.

13. The system of claim 12, wherein the search module includes:

a key locating and extracting module configured to locate a plurality of keys in the at least one of the first data and the second data based on key lengths and value lengths; and a comparing module configured to compare the predetermined key to the plurality of keys and to generate a match signal when the predetermined key matches one of the plurality of keys, wherein the key locating and extracting module determines an offset based on the match signal, the key lengths and the value lengths.

14. The system of claim 7, further comprising

N flash controllers, wherein N is an integer greater than one, wherein one of the N flash controllers includes the second PCIe interface and wherein others of the N flash controllers include N−1 PCIe interfaces, respectively; and a PCIe switch configured to selectively connect the first PCIe interface to one of the second PCIe interface or one of the N−1 PCIe interfaces.

15. A method comprising:

providing a data storage interface for an application executed by a system;

via a first Peripheral Component Interconnect Express (PCIe) interface communicating with a driver module, communicating with a second PCIe interface associated with a flash controller for flash memory, sending first key-value pairs to the second PCIe interface using a native PCIe protocol for storage in the flash memory, and receiving second key-value pairs from the second PCIe interface using the native PCIe protocol after retrieval from the flash memory, wherein each of the first key-value pairs and each of the second key-value pairs includes a unique number and a data value;

via a direct memory access (DMA) engine module in the flash controller, transferring data between a second PCIe interface, a first memory and a second memory;

via a flash control module in the flash controller, controlling the first memory; and via a memory control module in the flash controller, controlling the second memory.

16. The method of claim 15, further comprising, via the second PCIe interface of the flash controller, storing the first key-value pairs to the flash memory in a B tree data structure and retrieving the second key-value pairs from the flash memory.

17. The method of claim 16, wherein the flash memory is the first memory.

18. The method of claim 17, further comprising, via the flash controller:
   receiving at least one of first data and second data; and
   searching at least one of the first data and the second data for a predetermined key while the at least one of the first data and the second data is being transferred.

19. The method of claim 18, further comprising, via the flash controller:
   locating a plurality of keys in the at least one of the first data and the second data based on key lengths and value lengths;
   comparing the predetermined key to the plurality of keys;
   generating a match signal when the predetermined key matches one of the plurality of keys; and
   determining an offset based on the match signal, the key lengths and the value lengths.

20. The method of claim 15, further comprising selectively connecting, via a PCIe switch, the first PCIe interface to one of the second PCIe interface or one of N−1 PCIe interfaces, where N is an integer greater than one, wherein one of N flash controllers includes the second PCIe interface, and wherein others of the N flash controllers include the N−1 PCIe interfaces.

\* \* \* \* \*